United States Patent Office 2,926,069
Patented Feb. 23, 1960

2,926,069

ALKALI METAL ALUMINATES

Tom S. Perrin, Robert G. Banner, and Robert C. Smith, Painesville, Ohio, assignors to Diamond Alkali Company, Cleveland, Ohio, a corporation of Delaware No Drawing. Application June 27, 1956
Serial No. 594,110

9 Claims. (Cl. 23—52)

This invention relates to a process for producing alkali metal aluminates and, more particularly, it relates to the production of purified alkali metal aluminates from hydrated aluminum oxide materials that contain undesired amounts of impurities such as vanadium, chromium, silica, and the like.

Heretofore, alkali metal aluminates have been prepared generally by extracting alumina from bauxite, clays and other siliceous alumina-bearing materials by heating such materials with an alkali substance. The alkali metal aluminates prepared in this manner most always contain varying amounts of impurities and in most instances it is desirable to further treat the product to remove or reduce the amount of impurities present. Thus, in the commercial application of sodium aluminate, such, for example, as in the textile, rayon and paper industries, it is necessary that the sodium aluminate contain a minimum of impurities. For this reason, previous efforts have been made to reduce or remove the amount of impurities present in order to obtain a more salable product meeting the requirements of industrial users.

It has now been found, in accordance with the process of this invention, that a high-grade purified alkali metal aluminate can be prepared from a hydrated aluminum oxide material containing undesired amounts of silica, vanadium and chromium. Briefly stated, the invention relates to a process for producing an alkali metal aluminate which comprises the steps of contacting a material comprising alumina and contaminated with silica, vanadium and chromium impurities with an alkali metal hydroxide, lime and a ferrous salt at an elevated pressure and thereafter recovering a purified alkali metal aluminate. By the process of this invention a high-grade alkali metal aluminate can be produced containing negligible amounts of the impurities mentioned. By the term alkali metal aluminate, it is intended to include sodium, potassium and the other alkali metals.

As mentioned, the process of this invention is applicable to the production of alkali metal aluminates from hydrated aluminum oxide materials contaminated with undesired amounts of silica, vanadium and chromium. In this connection, and for purposes of illustration, Table I below shows an analysis of two representative aluminum oxide-containing materials that can be employed in the process of this invention.

TABLE I

|  | Analysis of Material, Percent | |
| --- | --- | --- |
|  | 1 | 2 |
| $Al_2O_3$ | 60.6 | 74.0 |
| $Na_2CrO_4$ | 0.77 (based on $Al_2O_3$) | 5.08 (based on $Al_2O_3$) |
| $V_2O_5$ | 0.24 (based on $Al_2O_3$) | 1.17 (based on $Al_2O_3$) |
| $SiO_2$ | 0.439 (based on $Al_2O_3$) | 1.31 (based on $Al_2O_3$) |
| $H_2O$ | remainder | remainder |

Typical of the alumina-containing materials shown in Table I above are those obtained as by-products in chrome process plants. In these plants, chrome ore is roasted and leached, and the liquor recovered from the leaching step consists of alumina, caustic and impurities such as those shown in the table above. The leach liquor is treated with sulfuric acid to precipitate the alumina and then filtered. The precipitate accumulates as a wet cake and is removed as such. As shown in Table I above, the alumina value of the wet cake can range from approximately 60 to 74% by weight of the wet mass. Although this type of material is applicable in the process of this invention, material containing higher or lower percentages of alumina can be employed. In the description of this invention, however, and in the examples to be given hereinafter, the material described above will be used for purposes of illustration. As stated, the alumina-containing material usually forms a cake on the filtering apparatus and when recovered, can be used directly in a wet or a dried condition. For economical reasons, it is preferred to employ the wet cake.

Generally, in carrying out the preparation of sodium aluminate in the process of this invention, the aluminum oxide material is mixed with concentrated sodium hydroxide, lime, and a ferrous salt and the mixture is heated in a pressure vessel at pressures of from 50–125 lbs./sq. in. and preferably at from 90–110 lbs./sq. in. Good removal of impurities from the aluminum oxide material is obtained at pressures of 100 lbs./sq. in. At a pressure of 100 lbs./sq. in., and a reaction time of from 1 minute or less and up to 30 minutes, advantageous and unexpected results are obtained. With this reaction time, the removal of silicates and vanadium is most effective, as is a high recovery of alumina values from the sodium aluminate solution.

At the preferred pressures of 90–110 lbs./sq. in., the temperatures usually obtained range from 180° to 190° C. Temperatures below room temperature should preferably not be used in the process of this invention, since silica removal is not satisfactory. It should be understood, however, that temperatures lower than 180° C. or higher than 190° C., at the pressure stated, can be employed, although at the temperature range of 180–190° C. the removal of silica is almost complete.

Although the proportions of sodium hydroxide that can be added to the hydrated aluminum in the reaction mixture can vary, depending on the amount of aluminum oxide present, it has been found that proportions of sodium hydroxide that will give a sodium aluminate of from 25–45% concentration are satisfactory. Sodium aluminate solutions of higher concentration result in lesser recovery of silica and alumina values therefrom. Actually, however, concentrations higher than 40% tend to become too viscous for sufficient agitation or filtering and as a consequence, alkali metal aluminate solutions of from 30–35% are preferred. In this connection, the preferred weight of solid caustic that can be employed ranges from 90–95 grams to 100 grams of the aluminum oxide. If the hydrated aluminum oxide cake is dried prior to the reaction, sufficient water is added to yield the desired sodium aluminate concentration. If a dry cake is employed, and an aqueous solution of sodium hydroxide is used in the preparation of a 35% sodium aluminate concentration, the concentration of the sodium hydroxide should be of the order of 45% or stronger. Although lower concentrations of sodium hydroxide can be used, the solution of the alumina cake in the caustic is increasingly difficult. If the aluminum oxide cake is used as a wet mass, then solid sodium hydroxide is preferably employed and an amount of water is added, if necessary, sufficient to yield the desired sodium aluminate concentration.

The amount of lime to be employed in the process of this invention is calculated principally on the weight percent of the silica and vanadium based on the weight of alumina in the hydrated aluminum oxide cake. The weight ratio of calcium oxide to silica should be at least 20:1 to get good removal of silica and can be increased to a weight ratio of calcium oxide to vanadium pentoxide of 86:1 to obtain substantially complete removal of the vanadium impurity. It has been found, however, that the ratio of lime to silica should preferably not exceed the ratio of 28:1 since this ratio gives almost 100% removal of silica and substantial removal of the vanadium at a reaction time of from 1 minute or less and up to 30 minutes. A higher ratio can be used, but the effect is believed to be detrimental since calcium apparently reacts with sodium aluminate to form calcium aluminate and thus reduce the alumina value in the final sodium aluminate solution. It should be mentioned that for this reason the removal of silica from sodium aluminate solutions at atmospheric pressure is undesired since in such a case a ratio of calcium oxide to silica of at least 60:1 is necessary for efficient removal of the silica. Such amounts of lime are detrimental and have adverse effects on recovery of alumina values as noted above. Thus, with the preferred calcium oxide concentrations, elevated pressures, and reaction times of from 1 minute or less and up to 30 minutes, certain desirable and unexpected results are obtained in the process of this invention. In this instance, for example, the lime, at a weight ratio of 28:1 to silica, removes nearly all of the silica in from about 1 to 10 minutes and a substantial proportion of the vanadium, and the detrimental effect of it (lime) upon the sodium aluminate is almost completely eliminated because of this short contact time. In general then, a minimum contact time between the lime and the sodium aluminate solution is highly desirable.

As ferrous salts that are added to the sodium aluminate for the purpose of removing chromium in accordance with the process of this invention are ferrous sulfate, chloride, nitrate, and the like. Ferrous sulfate is preferred. It has been found that an excess of 1 equivalent ferrous sulfate is needed per equivalent of chromium present in the sodium aluminate mixture in order that the chromium be substantially removed. The weight of the chromium oxide impurity is based on the percentage by weight of the alumina present in the mixture. For efficient removal of the chromium compounds, therefore, from 1 to 2 or more equivalents of ferrous sulfate should be employed depending on the weight percent of the chromium impurity.

In a preferred procedure for carrying out the process of this invention, a wet hydrated aluminum oxide cake is reacted with solid caustic to make a solution of sodium aluminate. An analysis of this solution is carried out to determine the amounts of silica, vanadium and chromium present as impurities in order to add the desired proportions of lime and ferrous compounds and to obtain a solution of sodium aluminate of from 35-40% concentration. After addition of the desired proportions of lime and ferrous sulfate, the mixture is added to an autoclave and heated to 100 lbs./sq. in. pressure and held at such pressure for from a few seconds up to 20 minutes. The autoclave is then immediately brought to atmospheric pressure and the solution is cooled and filtered. If desired, the wet hydrated aluminum oxide mixture can be dried by heating it in an oven at a temperature of 110° C. for from about 2 to 3 hours and then mixed with the required proportions of caustic, lime and ferrous sulfate in an autoclave substantially as described before.

In the preferred procedure for carrying out the process of this invention, the amount of ferrous sulfate to be added to the sodium aluminate mixture can be controlled by determining the amount of chromate in the sodium aluminate solution. This is accomplished by preparing a set of standard solutions of sodium chromate of varying concentrations and comparing them visually or with a colorimeter with solutions of chromate containing sodium aluminate which have been prepared for such comparisons. Briefly, the process involved is as follows; a series of standard solutions of sodium chromate are prepared ranging from .01% to 2% or higher in concentrated phosphoric acid. The chromate containing sodium aluminate solutions are prepared by diluting samples of the liquid with water and adding concentrated sulfuric and phosphoric acid and then digesting the mixture until the solution is clear. The solution is then compared with a series of the standard solution to determine the concentration of the chromium present. After this determination, a calculated amount of ferrous sulfate is added to the reaction for the removal of chromate.

Upon completion of the reaction in the pressure vessel, the 35-40% sodium aluminate solution is diluted with sufficient hot water to give an aluminate concentration of about 22% for purposes of filtering. Solutions of 22% sodium aluminate concentration give good filtering properties, although lower or higher concentrations of sodium aluminate solutions can also be filtered. After filtering, the solution can be reconcentrated to a sodium aluminate value of 35-42% or can be dried and shipped or stored. If the solution is to be stored, it is advantageous to concentrate to 35-42%, i.e., at a boiling point of about 118° C., in order to prevent hydrolysis of the sodium aluminate and, therefore, precipitation of aluminum hydroxide. At concentrations of from 35-42% it is desirable to have the presence of free caustic in the sodium aluminate solution in order to prevent hydrolysis of the mixture. Thus, the amount of free caustic can be added as excess at the beginning of the reaction and it should be at least about 4% excess for a 40% sodium aluminate solution. The addition of organic compounds, (e.g., the Versenes) in small concentrations in order to stabilize the solution is also within the scope of this invention.

In order that the process of this invention may be more fully understood by those concerned, reference is made to the following examples.

*Example 1*

A hydrated aluminum oxide material obtained as a cake from a chrome processing plant analyzes as follows: $Al_2O_3$ 60.6%, $Na_2CrO_4$ 5.08%, $V_2O_5$ 1.17%, $SiO_2$ 1.31%, the impurities based on the weight of $Al_2O_3$, and the remainder is water. To 1036 grams of this mixture is added 1230 grams of a 49.8% sodium hydroxide solution, 238 grams of lime and 170 grams of ferrous sulfate dissolved in 377 grams of water. This mixture is calculated to give a 35.7% sodium aluminate solution before diluting for filtering purposes. The weight of the caustic used is calculated to be 95.8 grams of solid sodium hydroxide per 100 grams of alumina and the amount of lime is based on a $CaO:SiO_2$ weight ratio of 30:1.

The reaction mixture is placed in an autoclave and heated to a temperature of 188° C. at 100 lbs./sq. in. pressure and held there for 20 minutes with agitation. After the pressure period, the autoclave is cooled as quickly as possible and the contents are diluted with 1256 grams of hot water and filtered. The residue from the mixture is washed with 666 grams of hot water and the total filtrate which contains 20.1% of sodium aluminate is then concentrated or dried as the final product. The percent of alumina recovered is 80.6%. An analysis of the sodium aluminate solution shows that the vanadium impurity is reduced to 0.026%, or 88.3% removal; the sodium chromate is reduced to less than 0.002%, or substantially 100% removal; and the silica reduced to less than 0.002% or substantially 100% removal.

This example demonstrates the unexpected removals of the impurities by the process of this invention.

Example II

In this example, a wet hydrated aluminum oxide material analyzes as follows: $Al_2O_3$ 27%, $Na_2CrO_4$ 0.77%, $V_2O_5$ 0.24%, $SiO_2$ 0.439%, the impurities based upon the weight of the alumina in the wet cake which contains about 60–70% water. The procedure for this preparation is varied in that a sodium aluminate solution is first prepared and the amount of sodium chromate in the solution is determined by comparing with a series of standard chromate solutions. After this, the desired amounts of lime and ferrous sulfate are added and the reaction carried out as before.

For this example, 400 grams of flake sodium hydroxide is put in a beaker and a small amount (100–200 grams) of wet cake is added while heating and agitating the mixture. The reaction mixture almost immediately forms a "heel" for the addition of the rest of the cake. The temperature of the solution after the addition of the first small amount of alumina cake is in the range of 80–90° C., and cake is added in small amounts until the reaction takes on a dark reddish-brown translucent appearance. This appearance means that a solution has been formed. More cake is added until it is obvious that no more will dissolve. A boiling point of 120° C. is maintained for 10 to 15 minutes to insure that that point has been reached. The total amount of alumina cake added is 2040 grams. A small sample, i.e., 25 ml. of this sodium aluminate is diluted with 25 ml. of hot water and this solution is added in small quantities to a heated 100 ml. mixture of acids consisting of 40 ml. of concentrated $H_2SO_4$ and 20 ml. of concentrated $H_3PO_4$ per 100 ml. of solution. The mixture is digested until the solution is clear. When clear, the solution is diluted to 1 liter with cold water and samples of this are compared with standards made up to represent certain percentages of sodium chromate. The standards are prepared by adding a known amount of chromate to a solution containing 20 ml. of concentrated $H_3PO_4$ per liter. The amount of sodium chromate in the aluminate solution can thus be easily determined by comparing the samples with the standards either visually or with a colorimeter and thus the desired amount of ferrous sulfate to be employed can be determined. For the example of sodium aluminate given above, 16.0 grams of ferrous sulfate in 370 ml. of water are added and lime in a $CaO:SiO_2$ weight ratio of 28:1, i.e., 66.6 grams is also added. The mixture is calculated to give a 35% solution of sodium aluminate in the autoclave. The reaction mixture is autoclaved and heated to 100 lbs./sq. in. pressure and held for 10 minutes. The temperature of the solution in the autoclave is 190° C. The autoclave, after the reaction period, is immediately brought to atmospheric pressure and the solution diluted with 2230 mls. of hot water and filtered. The total filtrate contains 22% of sodium aluminate which can thereafter be concentrated to a 35 to 42% solution of sodium aluminate. The percent of alumina recovered is 88%. Analysis of the sodium aluminate solution shows that the vanadium impurity is reduced to 0.078%, a 62% removal; the sodium chromate is reduced to 0.002% or substantially 100% removal; and the silica is reduced to 0.002% or substantially 100% removal.

It should be mentioned that in the above example the solution recovered from the autoclave can be filtered without diluting with water and consequently eliminating the necessity of much of the reconcentration step.

Example III

In a commercial process for carrying out a sodium aluminate preparation in accordance with this invention, a batch process plant producing 1100 gallons of a purified solution of a 20.1% sodium aluminate operates as follows: To a batch autoclave there is added 3000 lbs. of hydrated aluminum oxide material analyzing 60.6% $Al_2O_3$, 0.8% $SiO_2$, 0.71% $V_2O_5$ and 3.07% $Na_2CrO_4$, the impurities based on the weight of the alumina and the remainder is water; 688 lbs. of lime calculated to a $CaO:SiO_2$ weight ratio of 28.5:1; 492 lbs. of $FeSO_4 \cdot 7H_2O$ dissolved in 1090 lbs. of water and 1770 lbs. of NaOH as a 50% solution. The mixture is heated to a pressure of 100 lbs./sq. in. and held for 20 minutes, the temperature of the solution being 190° C. After the reaction period, the autoclave is immediately brought to atmospheric pressure and the contents cooled with 3640 lbs. of hot water and filtered. The filter cake is then washed with 1930 lbs. of hot water and the total filtrate then amounts to 1100 gallons of a sodium aluminate solution of 20.1%. The impurities in the solution are present in the following amounts: $V_2O_5$ 0.026%, $SiO_2$ less than 0.002%, $Na_2CrO_4$ less than 0.002%. The latter two impurities being almost completely removed. If desired, the sodium aluminate solution is concentrated to from 35 to 42% and dried, e.g., in a double drum drier to obtain 3125 lbs. of a solid sodium aluminate. In either case, whether concentrated or solid, the sodium aluminate is in a highly purified form meeting the requirements of commercial users. At eight batches per day such a plant can produce 8800 gallons of a 20.1% sodium aluminate solution. It should be understood that a continuous process for producing sodium aluminate is within the scope of this invention.

Having thus described this invention with reference to certain preferred embodiments, it should be understood that various modifications will be apparent to those skilled in the art and it is intended to cover all modifications within the scope and spirit of the appended claims.

What is claimed is:

1. A process for producing sodium aluminate from an alumina-containing material contaminated with silica, vanadium, and hexavalent chromium impurities which comprises adding concentrated sodium hydroxide, lime and a ferrous salt to said material, said lime being added in a weight ratio of at least 20:1 for silica and up to 80:1 for vanadium, heating said mixture at an elevated pressure and recovering therefrom a sodium aluminate substantially free of silica, vanadium, and hexavalent chromium impurities.

2. A process for producing sodium aluminate from an alumina-containing material contaminated with silica, vanadium, and hexavalent chromium impurities which comprises adding concentrated sodium hydroxide, lime and a ferrous salt to said material, said lime being added in a weight ratio of at least 20:1 for silica and up to 80:1 for vanadium, heating said mixture to a temperature of from 180 to 190° C. at a pressure of from 50 to 125 lbs./square inch and recovering therefrom a sodium aluminate substantially free of silica, vanadium, and hexavalent chromium impurities.

3. A process for producing sodium aluminate which comprises adding concentrated sodium hydroxide, lime and a ferrous salt to an hydrated aluminum oxide material contaminated with minor amounts of silica, vanadium, and hexavalent chromium, said lime being added in a weight ratio to silica of 20:1 to 30:1, said ferrous salt being added in proportions of at least one equivalent per equivalent of chromium in the aluminum oxide material, heating said mixture at from 180 to 190° C. at a pressure of from 90 to 110 lbs./square inch for from less than 1 minute and up to 20 minutes and thereafter recovering a sodium aluminate solution substantially free of silica, vanadium, and hexavalent chromium impurities.

4. A process for producing sodium aluminate which comprises adding sodium hydroxide of at least 45% concentration, lime and a ferrous salt to an hydrated aluminum oxide material contaminated with minor amounts of silica, vanadium, and hexavalent chromium, the proportions of said sodium hydroxide and hydrated aluminum oxide material added to form a sodium aluminate of from 25 to 40% concentration, the amount of lime added in a weight ratio to silica of from 20:1 to 30:1, the ferrous salt added in excess of one equivalent per equivalent of chromium in the aluminum oxide material, heating said mixture at from 180 to 190° C. at a pressure of from 90 to 110 lbs./square inch for less than 1 minute and up to 20 minutes and thereafter recovering a sodium aluminate solution substantially free of silica, vanadium, and hexavalent chromium impurities.

5. The process of claim 4 wherein the sodium hydroxide is solid sodium hydroxide.

6. The process of claim 4 wherein the proportions of sodium hydroxide and hydrated aluminum oxide material are added in amounts to form a 35% solution of sodium aluminate.

7. The process of claim 4 wherein the lime is added in a weight ratio to silica of 28:1.

8. The process of claim 4 wherein the pressure is 100 lbs./square inch.

9. The process of claim 4 wherein the reaction mixture is heated for 10 minutes.

References Cited in the file of this patent
UNITED STATES PATENTS

| | | |
|---|---|---|
| 1,522,698 | Parsons | Jan. 13, 1925 |
| 2,442,226 | Wall | Mar. 25, 1948 |
| 2,612,435 | Perrin | Sept. 30, 1952 |

FOREIGN PATENTS

| | | |
|---|---|---|
| 400,984 | Great Britain | May 4, 1932 |

OTHER REFERENCES

Journal of Metals, vol. 3, pages 389–390, May 1951.